United States Patent
Nath et al.

(10) Patent No.: US 12,124,782 B1
(45) Date of Patent: Oct. 22, 2024

(54) MACHINE LEARNING-ENABLED ESTIMATION OF PATH-BASED TIMING ANALYSIS BASED ON GRAPH-BASED TIMING ANALYSIS

(71) Applicant: Synopsys, Inc., Mountain View, CA (US)

(72) Inventors: Siddhartha Nath, Sunnyvale, CA (US); Vishal Khandelwal, Portland, OR (US)

(73) Assignee: Synopsys, Inc., Sunnyvale, CA (US)

( * ) Notice: Subject to any disclaimer, the term of this patent is extended or adjusted under 35 U.S.C. 154(b) by 456 days.

(21) Appl. No.: 17/516,441

(22) Filed: Nov. 1, 2021

Related U.S. Application Data

(60) Provisional application No. 63/112,737, filed on Nov. 12, 2020.

(51) Int. Cl.
G06F 30/3312 (2020.01)
G06F 119/12 (2020.01)
G06N 5/01 (2023.01)

(52) U.S. Cl.
CPC ........... G06F 30/3312 (2020.01); G06N 5/01 (2023.01); *G06F 2119/12* (2020.01)

(58) Field of Classification Search
USPC ........................................................ 716/100
See application file for complete search history.

(56) References Cited

U.S. PATENT DOCUMENTS

| | | | |
|---|---|---|---|
| 10,867,091 B1* | 12/2020 | Oh ........................ | G06F 30/331 |
| 2018/0013771 A1* | 1/2018 | Crabtree ............. | H04L 63/1416 |
| 2018/0150125 A1* | 5/2018 | HomChaudhuri .. | G06F 13/4282 |
| 2020/0082032 A1* | 3/2020 | Hills ..................... | G06F 30/398 |
| 2020/0372124 A1* | 11/2020 | Ting ........................ | G06F 30/33 |
| 2021/0073456 A1* | 3/2021 | Nath ........................ | G06N 5/01 |
| 2021/0157312 A1* | 5/2021 | Cella ................... | G01M 13/045 |
| 2022/0261524 A1* | 8/2022 | Gao ..................... | G06F 30/3323 |
| 2023/0376659 A1* | 11/2023 | Lu ......................... | G06F 30/392 |

OTHER PUBLICATIONS

Nath, S. et al. "Machine Learning-Enabled High-Frequency Low-Power Digital Design Implementation at Advanced Process Nodes." Proceedings of the 2021 International Symposium on Physical Design, Mar. 2021, pp. 83-90.

* cited by examiner

*Primary Examiner* — Mohammed Alam
(74) *Attorney, Agent, or Firm* — Fenwick & West LLP

(57) ABSTRACT

A graph-based timing analysis (GBA) is applied to a circuit design that includes a routed gate-level netlist to produce timing estimates of the circuit design. A machine learning (ML) model is applied to modify these GBA timing estimates of the circuit design to make them more accurate. For example, the ML model may be trained using timing estimates from path-based timing analysis as the ground truth, and using features of the circuit design from the GBA as input to the ML model.

20 Claims, 8 Drawing Sheets

MACHINE LEARNING-ENABLED ESTIMATION OF PATH-BASED TIMING ANALYSIS BASED ON GRAPH-BASED TIMING ANALYSIS

RELATED APPLICATION

This application claims priority under 35 U.S.C. § 119(e) to U.S. Provisional Patent Application Ser. No. 63/112,737, "Machine Learning-Enabled Estimation Of Path-Based Timing Analysis Based On Graph-Based Timing Analysis," filed Nov. 12, 2020. The subject matter of all of the foregoing is incorporated herein by reference in its entirety.

TECHNICAL FIELD

The present disclosure relates to timing analysis for the design of integrated circuits.

BACKGROUND

At advanced process nodes, semiconductor design and electronic design automation (EDA) companies must innovate to deliver integrated circuits with best-in-class power, performance and area with reduced turnaround time. Timing optimization and signoff are important parts of the overall design process. Timing signoff is most often done using accurate path-based timing analysis (PBA) to prevent over-design (excess area and/or excess power loss) while achieving aggressive target frequencies. However, the runtime penalty of PBA (due to exponential path tracing) has forced digital implementation methodologies to adopt faster but more pessimistic graph-based timing analysis (GBA) for static timing analysis during earlier implementation phases, and rely on PBA during final timing signoff recovery loops to contain the over-design that results from the more pessimistic GBA.

As technology nodes progress to smaller sizes, the gap between GBA vs. PBA timing estimates is increasing. The over-design incurred due to GBA pessimism in the implementation flow may not be fully recovered by engineering change order (ECO) recovery in the final PBA-based signoff, because the optimizations available in the later ECO recovery stage are not as rich as those available in earlier implementation stages. Physical synthesis flows are increasingly using advanced logic restructuring to carefully balance timing versus power and these moves are difficult to undo in ECO, where legalization and routing restrictions prevent large-scale re-synthesis. Similarly, any clock over-design (owing to clock skewing to fix timing) is not easy to dial back at the ECO stage. This motivates the need to run the earlier implementation flows using PBA accuracy, but without incurring the massive runtime overhead consumed by actual PBA simulations.

SUMMARY

In some aspects, a graph-based timing analysis (GBA) is applied to a circuit design to produce timing estimates of the circuit design. A machine learning (ML) model is applied to modify these GBA timing estimates of the circuit design to make them more accurate. For example, the ML model may be trained using timing estimates from path-based timing analysis as the ground truth, and using features of the circuit design produced by the GBA as input to the ML model.

In other aspects, an iterative timing optimization flow is applied to the circuit design. In iterations of the flow, timing estimates of the circuit design are produced (as described above, using GBA modified by a ML model) and the circuit design is modified based on these timing estimates. The timing optimization flow includes a timing convergence phase and a recovery phase. In the timing convergence phase, the circuit design is modified to meet timing constraints, such as setup and hold constraints. In the recovery phase, the circuit design is further modified to improve power and/or area subject to meeting the timing constraints. Different ML models may be used for in the timing convergence phase and the recovery phase.

Other aspects include components, devices, systems, improvements, methods, processes, applications, computer readable mediums, and other technologies related to any of the above.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
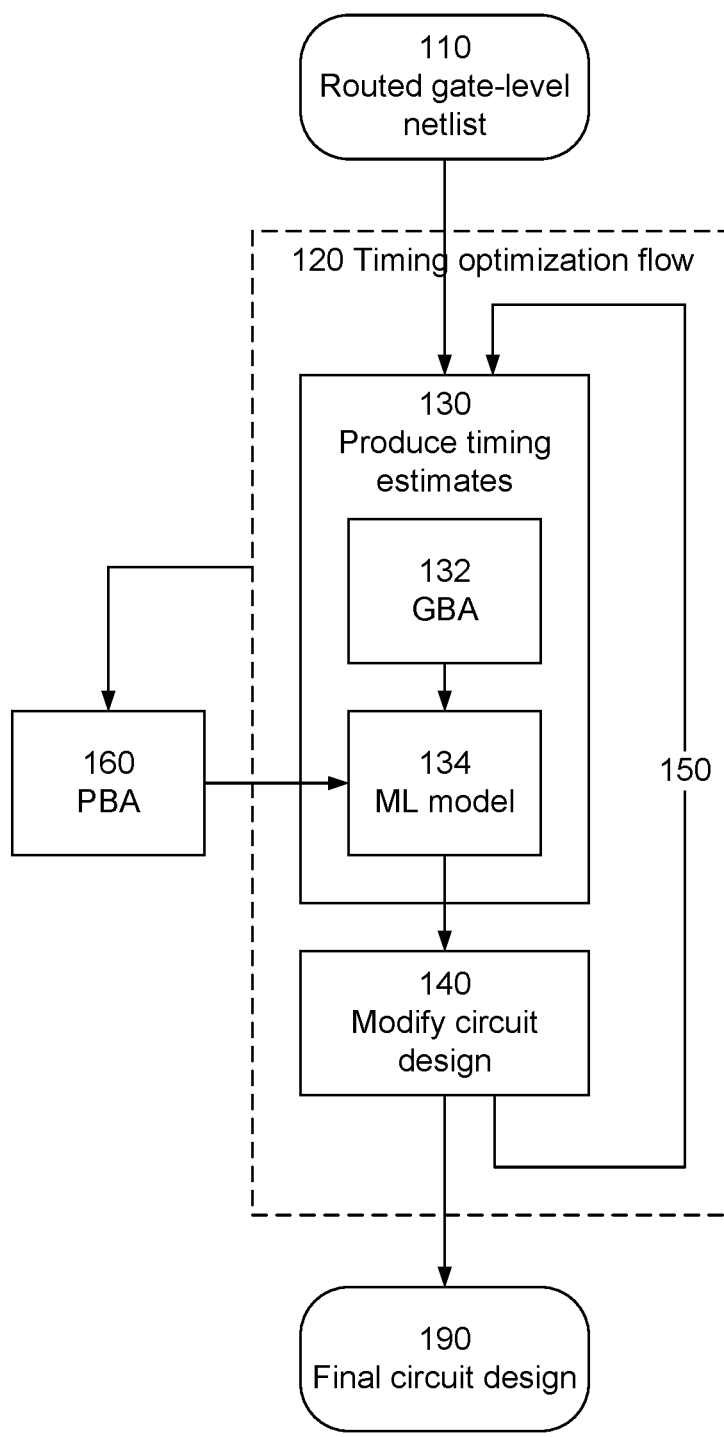
FIG. 1 is a flow chart of a post-route optimization flow using ML-modified GBA timing estimates.

Aspects of the present disclosure relate to machine learning-enabled estimation of path-based timing analysis (PBA) based on graph-based timing analysis (GBA). This enables timing analysis closer to PBA accuracy but with runtimes closer to GBA approaches. This disclosure describes the use of machine-learning (ML) models to predict PBA timing estimates from GBA timing estimates.

To perform timing analysis, the circuit netlist is represented as a node graph. In this timing graph (i.e., the node graph), the primary inputs and primary outputs of the circuit and the instance pins (i.e, pins of standard cells and macros in the circuit) are represented by nodes, and timing paths are represented by edges between nodes. The timing graph stores the relevant timing data for both setup and hold timing requirements, along with other timing constraints and exceptions (e.g., false paths, etc.).

A "merge" node is a node where multiple timing paths enter the node. Each of the timing paths entering the node is characterized by its own slew and different output slews may be produced depending on the situation. In GBA timing analysis, the worst slew from among the different situations is propagated through the merge node (e.g., to the output pin of the merge node). For setup analysis, "worst" refers to the slew with the largest numerical value. For hold analysis, "worst" refers to the slew with the smallest numerical value. The GBA approach reduces storage requirements since only one slew value needs to be stored at each of the merge nodes. Storing the single slew value at a merge node also enables fast calculation of timing since only the worst values are propagated per timing path. However, GBA is pessimistic since it is based on the worst case timing path at each merge node.

PBA timing analysis performs timing calculation and propagation for each timing path. To do this, PBA recalculates cell and net delays using slew values specific to a path. Thus, if multiple timing paths meet at a merge node, multiple values are stored at the merge node for the different timing paths, rather than just storing the worst case value at a merge node as in GBA. PBA is less pessimistic than GBA because timing paths are traced separately. However, PBA also requires more storage and longer runtime to compute.

PBA modes include path and exhaustive. In PBA path mode, PBA timing analysis is performed only on the worst GBA path. These are sometimes referred to as timing recalculations, because the GBA timing estimate is recalculated using the more accurate PBA approach. In PBA exhaustive mode, multiple paths in the logic cone to an endpoint are recalculated. In some cases, tools may exhaustively enumerate all paths to an endpoint. However, for runtime considerations, signoff tools may use an upper-bound for the number of paths used for exhaustive analysis. Regardless, this incurs huge runtime costs since multiple cell and net delays and slews are recalculated and propagated.

The difference between GBA and PBA timing estimates may be significant, especially at advanced technology nodes (e.g., 16 nm and smaller). The approach described herein uses ML models to overcome the runtime overhead of these PBA modes by modifying GBA-based timing estimates to be more PBA-like. The ML-modified timing estimates are used in post-route optimization. The use of the ML-modified timing estimates more closely approximates the accuracy of PBA timing estimates. This results in less pessimism during the implementation flow, which in turn yields better overall designs after final signoff.

The ML model may be trained "on-the-fly" during an iterative implementation flow. Timing paths for earlier iterations may be used to train ML models, which are then used in later iterations (or even later phases of the same iteration). The ML models also use features that are easily extracted as part of the GBA flow and are not runtime intensive. As a result, the ML enhancement may be easily plugged into existing implementation flows. Some implementations may use a "one-pass" flow in which a single pass is used to both train the ML model and to do model inference.

FIG. 1 is a flow chart of a post-route optimization flow using ML-modified GBA timing estimates. At this point of the design process, the circuit design has been placed and routed and is represented by a routed gate-level netlist 110. A flow 120 to improve timing (also referred to as a timing optimization flow) is then applied in order to address timing requirements. The flow is iterative, as shown by the iterations 150. The iterations typically include producing a timing estimate 130 and modifying the circuit 140. These steps may occur in either order.

For example, in a timing convergence phase of the flow 120, the system modifies the circuit design to meet timing constraints, such as setup and hold constraints. In the timing convergence phase, the timing estimates are first produced 130, for example in order to determine which timing paths violate setup or hold constraints. The circuit design is then modified 140 to fix these violations.

Once timing convergence is completed or mostly completed, the flow 120 may enter a recovery phase. In the recovery phase, the circuit design already meets timing requirements, but it is further modified to improve power and/or area performance subject to meeting the timing requirements. In this phase, the circuit design may be first modified 140 and then the timing estimate produced 130 to confirm that the modification did not introduce any new timing violations.

At least for some iterations and/or phases, the timing estimates may be produced 130 as follows. GBA 132 is applied to the circuit design to produce a timing estimate. This GBA-based timing estimate is then modified by a ML model 134. The resulting timing estimate is more accurate than the original GBA-based timing estimate, but does not require significantly more runtime to compute.

The ML model 134 may be trained using PBA-based timing estimates 160 applied to prior iterations. The ML model 134 may take the GBA-based timing estimate 132 as one input and use certain features of the circuit design as additional inputs, and use the PBA-based timing estimate 160 as the ground truth or label for training. The features preferably are extracted or readily available from the GBA computation 132 (or elsewhere in the design database), so that the feature extraction does not add significant runtime.

The ML timing-guided optimization of a GBA flow may be considered in two parts, as described in more detail below:

One aspect is the design of the ML-based predictor of PBA timing given GBA features. The following examples predict PBA slack across all endpoints in a design. Separate ML models are used for delay fixing and for secondary (e.g., area, power) recovery.

Another aspect is integrating these ML models in a post-route optimization flow. The flow without ML-based predictor calculates GBA and PBA timing at certain points. In the following examples, both the training and the inference of the ML models are integrated as part of this flow. This may be referred to as the ML-augmented GBA flow.

The following examples are also multi-corner multi-mode (MCMM). Timing is evaluated for multiple scenarios with different corners and different modes. Corners include variations in foundry process (e.g., slow, typical, fast) for each PMOS and NMOS in the gate, voltage, temperature, resistances and capacitances per unit length. Mode refers to different operating modes, such high-performance, overdrive, normal, low-power; these are defined by circuit constraints such as clock period, pin transitions, fanouts, capacitances, operating voltage, etc.

Advantages to the model-guided optimization described herein include the following. The ML model training process is fast in runtime, but still accurate. In addition, two-pass training and inference flows are avoided. Two passes can create large-scale deployment challenges due to data management issues for design teams that use ML-based solutions for the first time. The first advantage may be achieved by using a set of features that can be extracted from a design with low runtime overhead and a modeling algorithm that can train in parallel. In one embodiment, Random Forest Regressors are used as the modeling algorithm as trees can be trained in parallel using multiple-threads. This contains the post-route optimization flow runtime overhead relative to the baseline GBA flow, for example to <5% of the baseline GBA flow. The second advantage may be achieved by using "on-the-fly" training and inference. The ML models are trained using data from earlier iterations or earlier phases of the post-route optimization flow and then inference from these models is available for later iterations or phases, such as during delay fixing and recovery.

ML Model Features and Training

The following is a description of one embodiment of the ML model, including feature engineering, model architecture, model training and management. Domain knowledge of PBA and post-route optimization flows is used to identify features. Features (i.e., inputs to the ML model) are selected so that extracting them during the timing optimization flow does not incur large runtime overheads. Note that all of the features in this example are already collected for each MCMM scenario using GBA analysis. These features can be classified into the following categories, as summarized in Table 1.

Physical context. For the worst case timing path, ML features include the (x,y) placement coordinates of the startpoint (SP) and the endpoint (EP) of the timing path, and the bounding box of the nodes on the timing path. Bounding box is the smallest box that contains all of the nodes along the worst case timing path. These features capture layout of the critical (i.e., worst case) timing path to the endpoint for a given MCMM scenario and discriminates physical layout between paths. From the bounding box, additional ML features include the Manhattan wirelength of the path in the X and Y directions: WL(x) and WL(y).

Physical constraints. ML features include the number of dont_touch and size_only instances in the timing path, in order to assess how much of the path can be optimized. dont_touch and size_only are constraints set by the user. When the dont_touch attribute is set on an instance, the timing optimization engines will not attempt size or restructure this instance. When the size_only attribute is set, the instance can only be sized during timing optimization, but it cannot be restructured or buffered. Since the ML models may be trained before delay and recovery operations are run, these features are a way to distinguish paths where the PBA slack will diverge more from its GBA slack. For example, an instance with the dont_touch attribute set and slow slew at its input pins will not be optimized by the slew fixing operation because it has been marked as dont_touch. Therefore, the difference between PBA and GBA slack will be smaller for this path compared to another path in which all instances can be optimized.

Timing constraints. ML features include the count of pins/nodes in the timing path that violate maximum transition constraint as well as the endpoint arrival and required times in a MCMM scenario. The maximum transition constraint defines the maximum allowable time for the signal rise and fall transition times on each pin. That is, when the signal transitions from high to low or vice versa, it must transition in not longer than the time defined by the maximum transition constraint (s). These features identify paths that violate these constraints and therefore may undergo a lot of slew fixing in order to fix the violations, thus leading to a large divergence in the PBA vs GBA slack. The MCMM scenario name may also be used as a categorical feature. For modeling, the scenario names may be encoded using one hot encoding.

Logical context. ML features include the number of stages (which correlates to the number of gates or nodes along a timing path), the maximum fanout of any stage, the average fanout across all stages and sum of drive resistance of all instances in the path. These features discriminate paths based on their logic structures. The drive resistance is also an indicator of how optimizable the path is. For example, a path with small drive resistance indicates that most instances are already sized appropriately, and there may not be much difference in PBA vs GBA slack.

Timing context. ML features include capacitance and slew values of the startpoint and endpoint, sum of cell and net delays, the ratio of net delay to the total path delay, and the average capacitance and slew of the path. These features provide more details of the critical path so as to distinguish from other paths if any of the above list of features are similar.

Table 1 summarizes the feature vectors used in this example ML model, although other features may be used in other models, including different features from the same categories and also features from other categories.

TABLE 1

Example List of modeling features.

| Category | Number of Features | Features |
| --- | --- | --- |
| Physical context | 4 | SP(x, y), EP(x, y), WL(X), WL(Y) |
| Logical context | 4 | #stages in critical path, max fanout, avg fanout, sum of drive resistance |
| Timing context | 9 | SP cap and slew, EP cap and slew, sum of cell delays, sum of net delays, net to total delay, avg cap and slew |
| Physical constraints | 2 | #dont touch, #size only |
| Timing constraints | 4 | #violations of maximum transition constrain on critical path, EP arrival time, EP required time, MCMM scenario name |

Equation (1) is the modeling task.

$$\hat{y}^{PBA} = f(X^{GBA}, \theta) \quad (1)$$

Here, $X^{GBA}$ are the features in Table 1 and may also include the GBA-based timing estimate, $\theta$ are the ML model parameters (weights), and $\hat{y}^{PBA}$ is the PBA-based timing estimate or, equivalently, the correction to the GBA-based timing estimate. In this example, the timing estimate predicts the endpoint slack values for different MCMM scenarios. The labels (ground truth) used to train the ML model are the slack values predicted by PBA-based timing estimates. The supervised model is trained using features $X^{GBA}$ obtained from GBA analysis, whereas the labels are obtained from PBA analysis. Either PBA path or exhaustive modes may be used to produce the labels.

In this example, model training is based on minimizing the root mean square error (RMSE) metric between the predicted and actual PBA slack values. RMSE measures the error in slack per endpoint per scenario, and directly correlates with the design's total negative slack (TNS), which is a power performance area (PPA) figure of merit used in digital implementation flows.

Prediction of real-valued PBA slack using GBA features is a complex non-linear function-learning task. PBA slack depends on accurate slew and delay propagation, strength of drivers in the path, and path depth in the presence of on-chip variation. MCMM scenarios add to this complexity. Various types of modeling may be used, for example polynomial regression, Deep Neural Networks (DNNs) and variants of Random Forest algorithms.

In the following example, a variant of the Random Forest architecture is used as the modeling algorithm. Random Forest is an ML algorithm that builds an ensemble of decision trees (which make up the "forest") so as to minimize a loss function. Random Forest is used for the following reasons.

- The individual decision trees that make up the forest are independent and can be trained in parallel, which reduces the training time in the post-route optimization flow. Across all the datasets, the training time is <0.5% of the flow runtime.
- Random forest models are easier to debug compared to DNNs when there are outliers. In a production-quality implementation flow it is important to understand the reason(s) for poor prediction. An optimistic prediction of PBA slack will cause excessive area, power recovery and timing degradation. In contrast, a pessimistic prediction will lead to area and power being left on the table. Trees in a forest can be visualized and the feature and values used at each node can be viewed. Based on this visualization, a decision can be made as to how/whether to retrain a model and reduce the number of outliers.
- Hyper-parameters used to define a Random Forest model are intuitive, such as the number of trees, maximum depth of each tree, the minimum number of child nodes at each branching or split of the decision tree, etc. These enable easy tuning for model accuracy, training runtime and generalization.

Specifically, gradient-boosted Random Forests are used in the following example. Other gradient-boosted or supervised learning algorithms may also be used. To build a tree, proceed as follows.

- Randomly sample K % of the training dataset. This sampled dataset is referred to as the bootstrapped dataset.
- For each node of the tree, randomly select M % of the features from Table 1.
- From the set of selected features, choose a feature and a value that maximizes information gain at a node.
- Grow a binary tree by repeating the last two steps.
- Prune nodes of the tree that violate maximum depth or minimum number of child nodes criteria.

Figure 2:
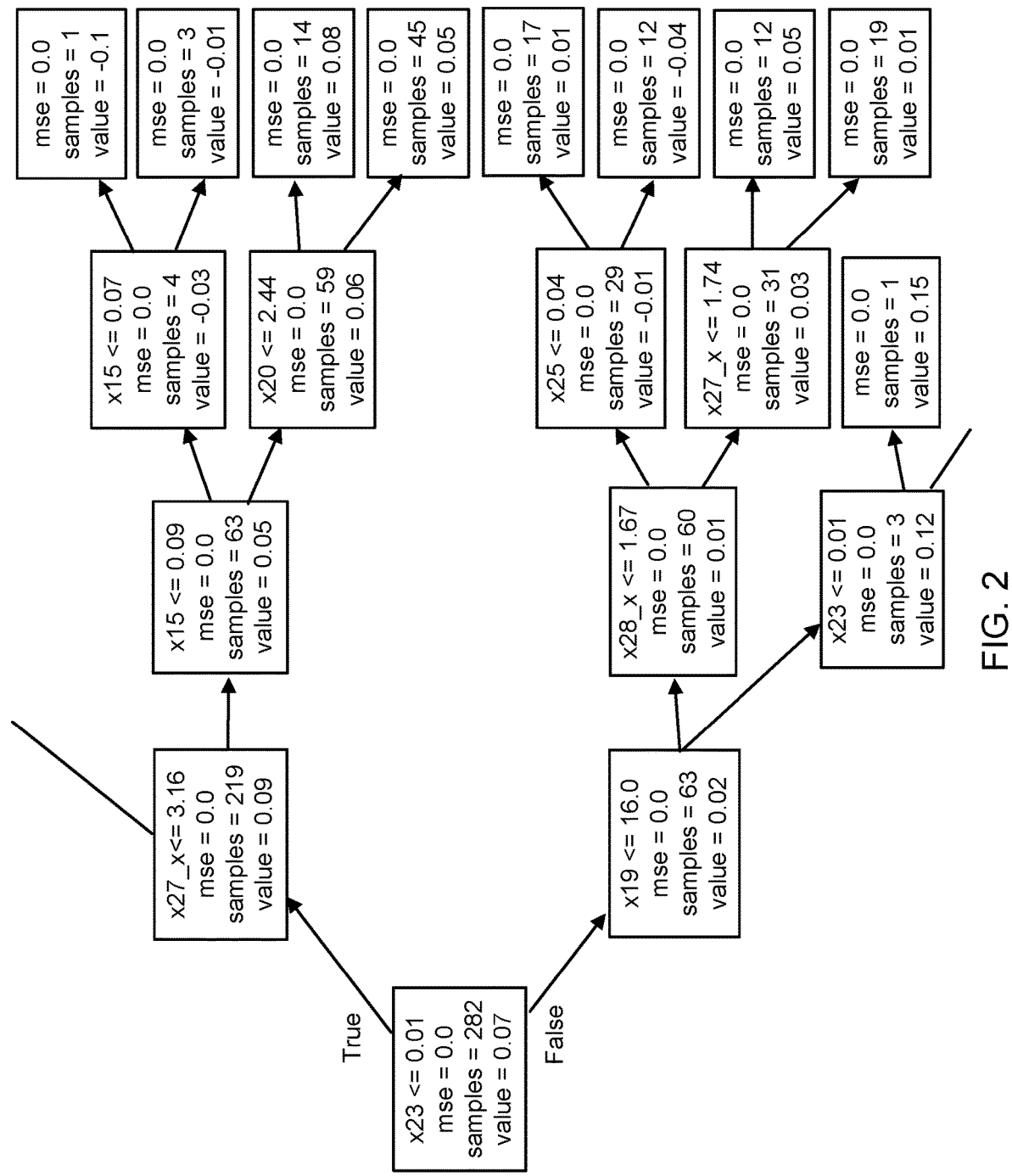
FIG. 2 is an example of a gradient-boosted tree.

FIG. 2 shows a portion of an individual tree constructed using data from an example design, using shortened feature names prefixed by "x". Each box in FIG. 2 represents a branching or split of the tree. The leftmost box is the root or trunk of the tree, and the leaves of the tree are the rightmost boxes (and any other terminal boxes). In each box, mse is the mean square error of all samples in that box, samples is the number of samples, and value is the GINI impurity index. The GINI impurity index is the probability of a feature to assign the samples to an incorrect distribution when chosen at random. This value ranges from 0 and 1, and a value <0.5 signifies a superior fitting of data. For non-leaf boxes, the expression with the feature name is the branching for that box. For example, the root box contains 282 samples with mse of 0.0 (perfect fit) and value of 0.07. The expression "x23<=0.01" shows the binary branching from the root box.

Of the 282 samples in the root box, this expression is true for 219 samples (top branch) and false for 63 samples (bottom branch).

Figure 3:
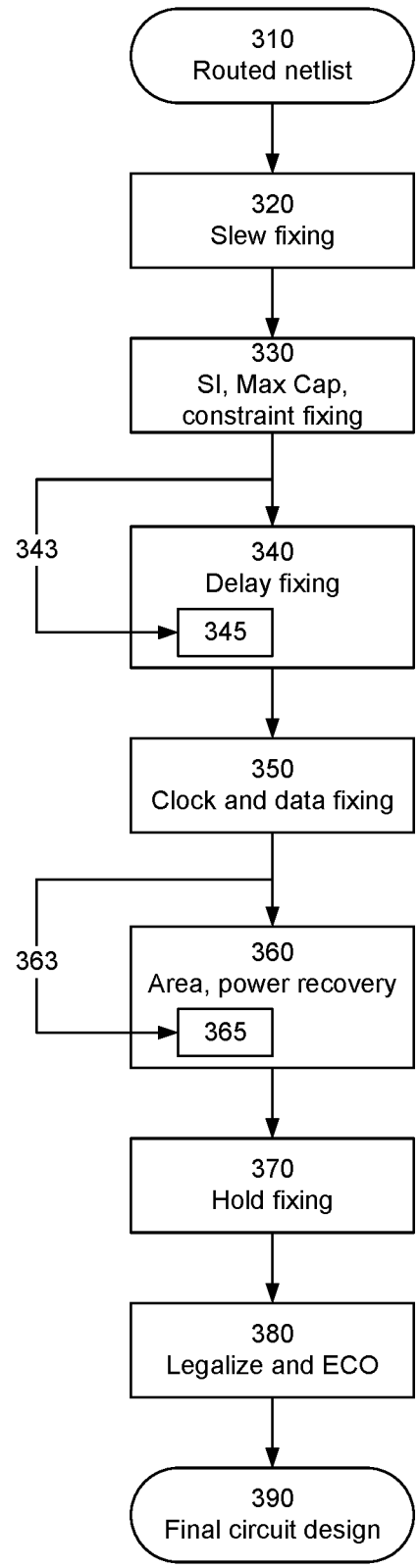
FIG. 3 is a flow chart of ML-modified GBA timing estimates integrated into a post-route optimization flow.

As with most gradient-boosted algorithms, the initial prediction is the average value of all labels. Thereafter, the values at the leaves of a branch are averaged, multiplied by the learning rate and added to the initial prediction to generate the predicted values for each test vector. The residuals are used to fit and grow subsequent trees. The output of the algorithm is an ensemble of trees in a forest. The maximum number of trees is controlled by using a hyper-parameter. The final prediction of the forest adds the initial predicted value to the predictions of each tree multiplied by the learning rate. When there are multiple leaves, their values are averaged to determine the prediction from a given tree. This example uses two models—one to be used in delay fixing and the other to be used in area and power recovery, as shown in FIG. 3.

Cross-validation and random search of hyper-parameters is used to generalize the models. To limit training runtime without trading off on test accuracy, a few hyper-parameters are used and random search is performed within some upper and lower bound values. Table 2 summarizes the hyper-parameters and their values used in this particular example. The number of folds in cross-validation is referred to by k. It is the number of folds or groups that samples can be split into; k−1 groups are used to build an initial model and the remaining one is used to validate the goodness of the fit. Pruning prevents each tree from overfitting to training samples. This example uses a bottom-up pruning mechanism which prunes out nodes when the information gain from the node is less than the pruning threshold. Other hyper-parameters and values for the hyper-parameters may be used in other cases. Gradient-boosted trees model feature interactions by splitting label distribution based on the decisions induced by sampled feature values at multiple levels of the tree. For a given feature vector, the prediction is with respect to joint decisions made by multiple feature values.

TABLE 2

Example List of hyper-parameters.

| Hyper-Parameter | Values |
| --- | --- |
| k-fold cross-validation | k = 5 |
| Max # trees in forest | 200 |
| Min, Max depth of any tree | 2, 6 |
| Subsample training data (K) | 50%-70% |
| Subsample features (M) | 50%-70% |
| Min child nodes | 2 |
| Pruning threshold (γ) | −0.005 to +0.005 |

Timing Optimization Flow Using ML Models

Integrating ML models effectively into digital implementation flows is important. ML model accuracy is an important aspect of the problem, but the integration of accurate ML models into complex implementation flows to produce better PPA is also important.

FIG. 3 is a flow chart of ML-modified GBA timing estimates integrated into a post-route optimization flow. This example uses two ML models 345, 365 for different phases of the timing optimization flow. First consider the post-route optimization flow without the ML models. The incoming routed netlist 310 is optimized for logical design rule checks (DRCs) such as slew fixing 320, and signal integrity (SI), max-capacitance, max-transition, and other constraint fixing 330. This is followed by iterations of timing optimization to fix worst negative slack (WNS) and total negative slack (TNS) for setup and hold timing. These iterations may employ both data path and clock optimization techniques. In the example flow of FIG. 3, delay fixing 340 fixes violations of setup timing constraints by modifying the data path and clock and data fixing 350 further allows modification of clocks to address setup timing violations. Once timing convergence is achieved, recovery engine 360 (again both data-path and clock) modify the circuit design to maintain the timing convergence, while recovering area and power from the design. In this example, meeting hold timing constraints 370 occurs after recovery 360, although steps may occur in different orders in different flows. Finally, the netlist is made legal (with respect to placement and routing) and any ECOs are also implemented at 380. In some flows, GBA is used for all optimization steps, although PBA may be used for final timing estimates.

Optimization engines deployed in such a flow typically do sizing, buffering, wire-optimization and controlled restructuring of both data and clock to achieve timing convergence with the best PPA. Given the complexity of placement and routing rules at advanced process nodes, an important consideration in post-route timing convergence is to minimize perturbations to legalization and routing. This post-route optimization flow can be invoked multiple times to drive incremental PPA convergence.

In FIG. 3, ML models 345, 365 are used to augment GBA timing to guide optimization steps to reduce the over-design (improve area and power), while keeping the runtime overhead low (e.g., <5%) relative to a GBA-only flow. In order to get accurate true PBA timing labels to train the model, "on-the-fly" training 343 of ML model 345 is implemented after logical DRC fixing 320/330 is done on the netlist. Since the timing histogram changes dramatically across timing optimization steps 340, 350, a second ML model 365 is used to drive area/power recovery 360. This ML model 365 is trained 363 using the netlist after timing convergence. Using the same ML model for delay fixing 340 and for area/power recovery 360 can lead to incorrect predictions and suboptimal area/power recovery.

In FIG. 3, the timing paths before delay fixing 340 are used to train 343 the ML model 345 used during delay fixing. The PBA slack, GBA slack and GBA features may be computed for a subset of these timing paths and then used to train 343 the ML model 345. The training set preferably is representative of the actual timing paths encountered during delay fixing 340. For example, delay fixing primarily operates on timing paths and endpoints which have setup violations. Accordingly, the training set may be made up of timing paths with setup violations. Once the ML model 345 is trained, it may be used repeatedly for the multiple iterations within delay fixing 340.

Predicting timing values after multiple loops of data/clock optimization engines have run is difficult as the netlist undergoes substantial changes that affect PBA slack computation. In one approach, if the PBA labels have a significant shift in distribution, a new model may be trained (or the existing model retrained) rather than continuing to use the old model without modification. Label distribution shifts may be determined based on standard distance metrics. For a typical post-route optimization flow, as shown in FIG. 3, the total number of models may be around three models: two ML models 345 for delay fixing and one ML model 365 for recovery.

To apply the ML model prediction in the optimization flow, a few strategies are implemented for both the delay fixing 340 and recovery fixing 360 steps. The ML models effectively predict the difference between GBA and PBA timing on a path and GBA timing estimates are adjusted on-the-fly to correlate with PBA timing estimates. The ML models 345, 365 may support full multi-corner multi-mode timing, so this adjustment is done for each timing scenario in the design to drive both delay optimization 340 and recovery 360 steps. Additional strategies to make targeted adjustments to GBA timing endpoints based on the metric being optimized may include the following:

1. In delay fixing 340, GBA-violating endpoints are targeted and their timing is adjusted to reduce over-optimization. Note that in a world of clock skewing, both negative and positive slack endpoints matter, so it is important to avoid ping-pong effects on endpoint slack as GBA timing is adjusted to correlate with PBA timing. Aggressive borrowing on just converged endpoints can create surprises when the netlist is timed with true PBA, so model accuracy is important.
2. For recovery 360, timing for endpoints is adjusted to truly reflect the PBA optimism (vs. GBA) and provide more headroom for recovery.
3. An extra timing margin (or guard band) may be applied to each endpoint so that delay can slightly over-fix so as to counter effects of delay pops on critical/near-critical paths during ECO routing 380, and recovery 360 does not aggressively downsize instances so that stages become very sensitive to incremental routing perturbations. In this example, an extra margin of 2 ps is used for this type of guard banding from ECO router noise, although other amounts of guard banding may be used instead.

When multiple iterations of the post-route optimization flow are run for incremental convergence, a second model may be trained for delay optimization and reused for all subsequent iterations. That is, the optimization flow uses at most three ML models: two for delay fixing 340 and one for recovery 360 for multiple iterations of the post-route optimization flow. To achieve signoff-quality PBA timing, the ML-augmented GBA timing is not used after optimization flow completes. Instead, final timing reports are generated using true PBA.

Technical Results

The following describes some modeling and flow integration results. These are just examples. Table 3 shows a list of 21 industrial designs, their technology nodes, instance counts, and whether they are leakage- or total power-centric. These designs are across multiple technology nodes 5 nm-16 nm.

TABLE 3

Industrial designs, their technology nodes, instance counts and power type.

| Node | Design(s) | # | #Instances | Power Type |
| --- | --- | --- | --- | --- |
| 16 nm | D16A-D16D | 4 | 161K-2.4M | All total power |
| 12 nm | D12A-D12C | 3 | 130K-855K | All total power |
| 7 nm | D7A-D7E | 9 | 331K-1.5M | Total power |
|  | D7F-D7I |  | 272K-492K | Leakage power |
| 5 nm | D5A-D5D | 5 | 94K-359K | Total power |
|  | D5E |  | 67K | Leakage power |

Figure 4:
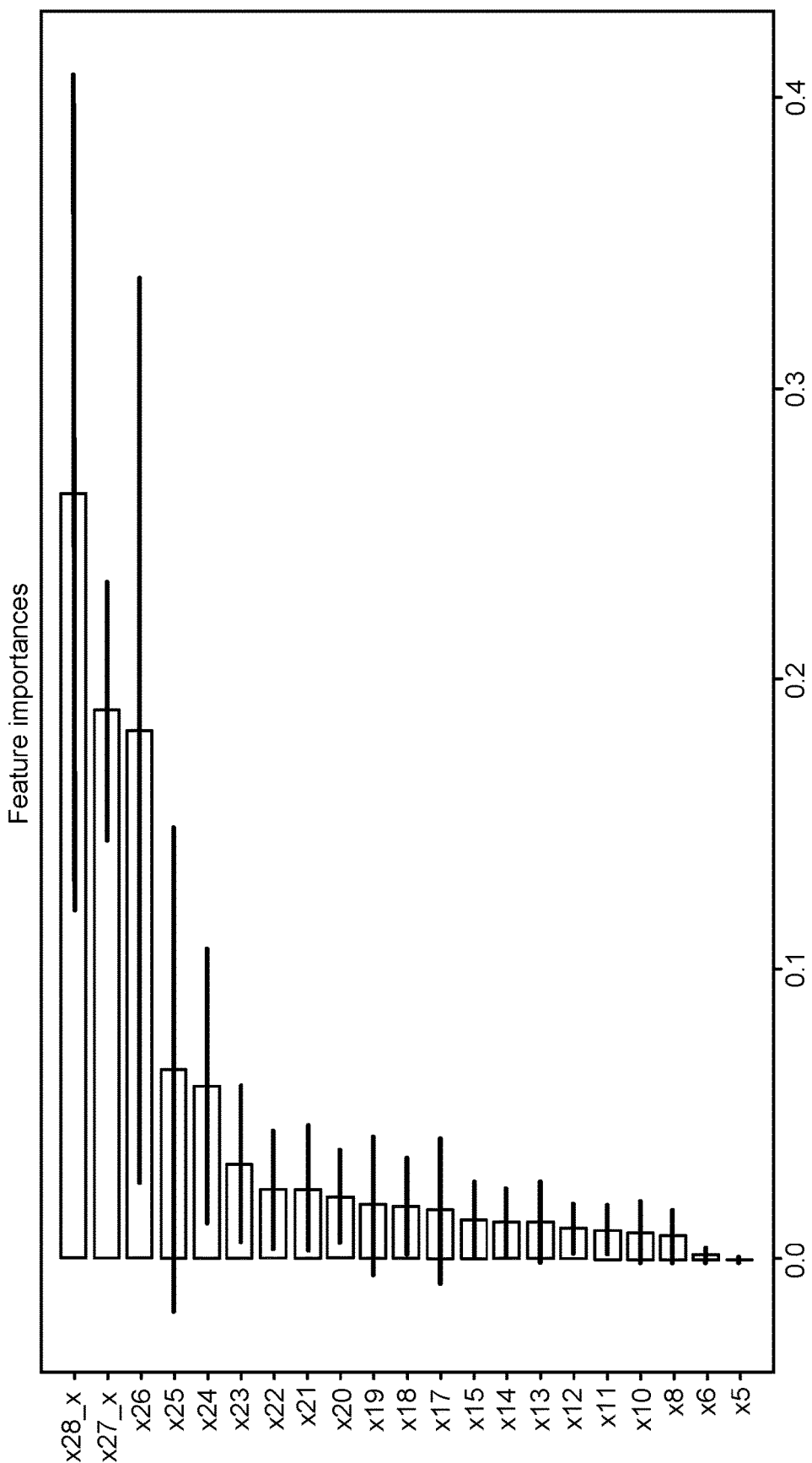
FIG. 4 shows mean and standard deviation of feature importance for delay model of Design D12A.

Training is based on 80% of the total dataset and the rest is used for testing. The training datasets contain between 800K-2.4 M datapoints. FIG. 4 shows feature importance during training for the 12 nm Design D12A. Each of the labels along the vertical axis is a different feature: x28_x, x27_x, etc. The horizontal axis shows the relative importance of each feature. The rectangular bar shows the mean of each feature, and the line shows the standard deviation. Arrival time or path delay at the endpoint (EP) (x28_x), required time at the EP (x27_x), and startpoint (SP) slew (x26) are the three most important features. Features SP slew (x26), arrival (x28_x), and SP cap (x25) also have large variation in importance across trees as shown by the black lines. Debug analysis reveals that these features are more important in initial trees than the latter ones. That is, they play a less important role in fitting residuals after a few stages of boosting. FIG. 4 suggests that in this particular example, except for SP(x,y) (x6) and average drive resistance (x5), all features play a significant role in improving model accuracy. The important features may be different for other situations.

Figure 5:
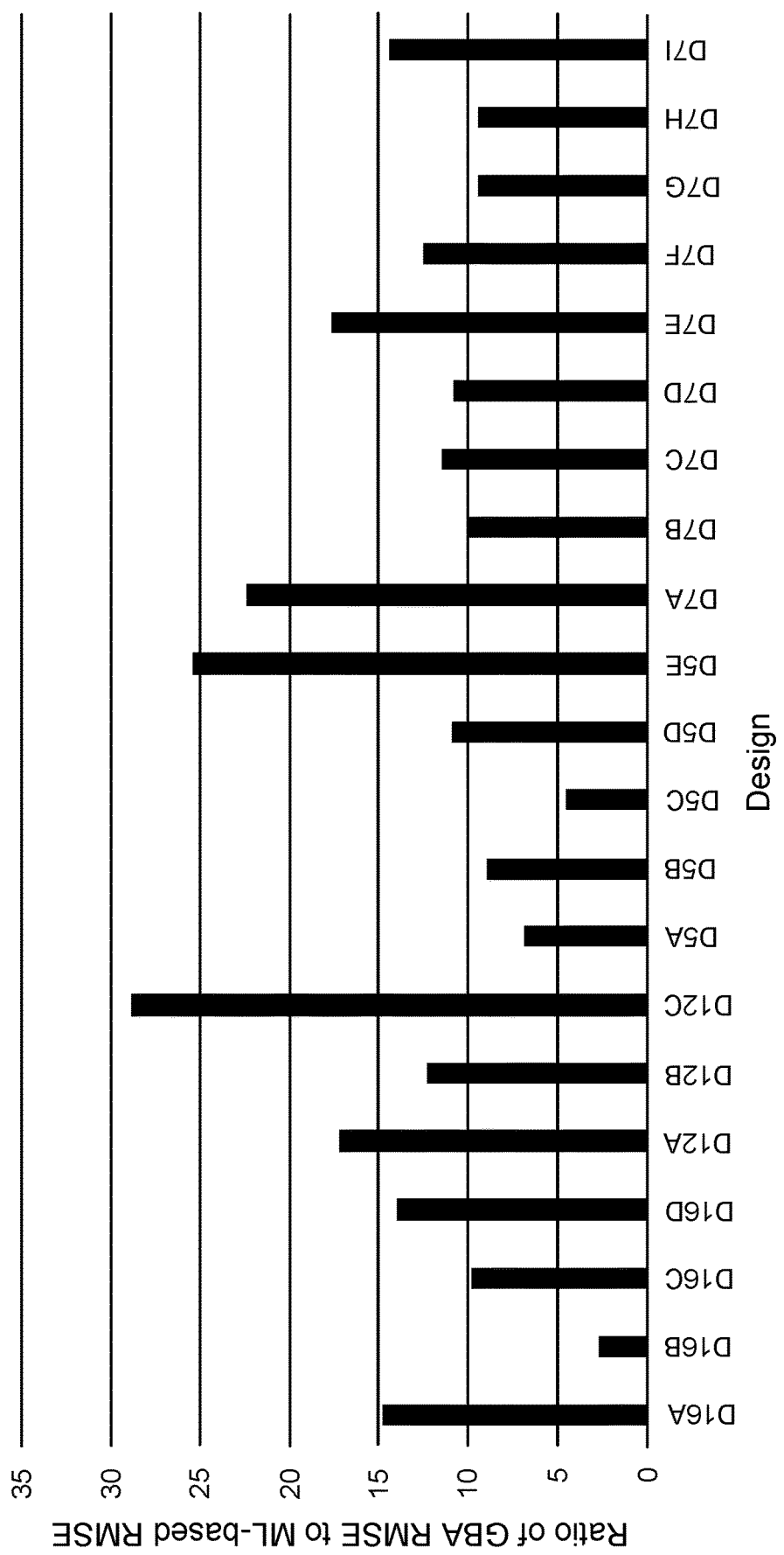
FIG. 5 plots ratio of root mean square errors (RMSEs) for the delay model for different designs.
Figure 6:
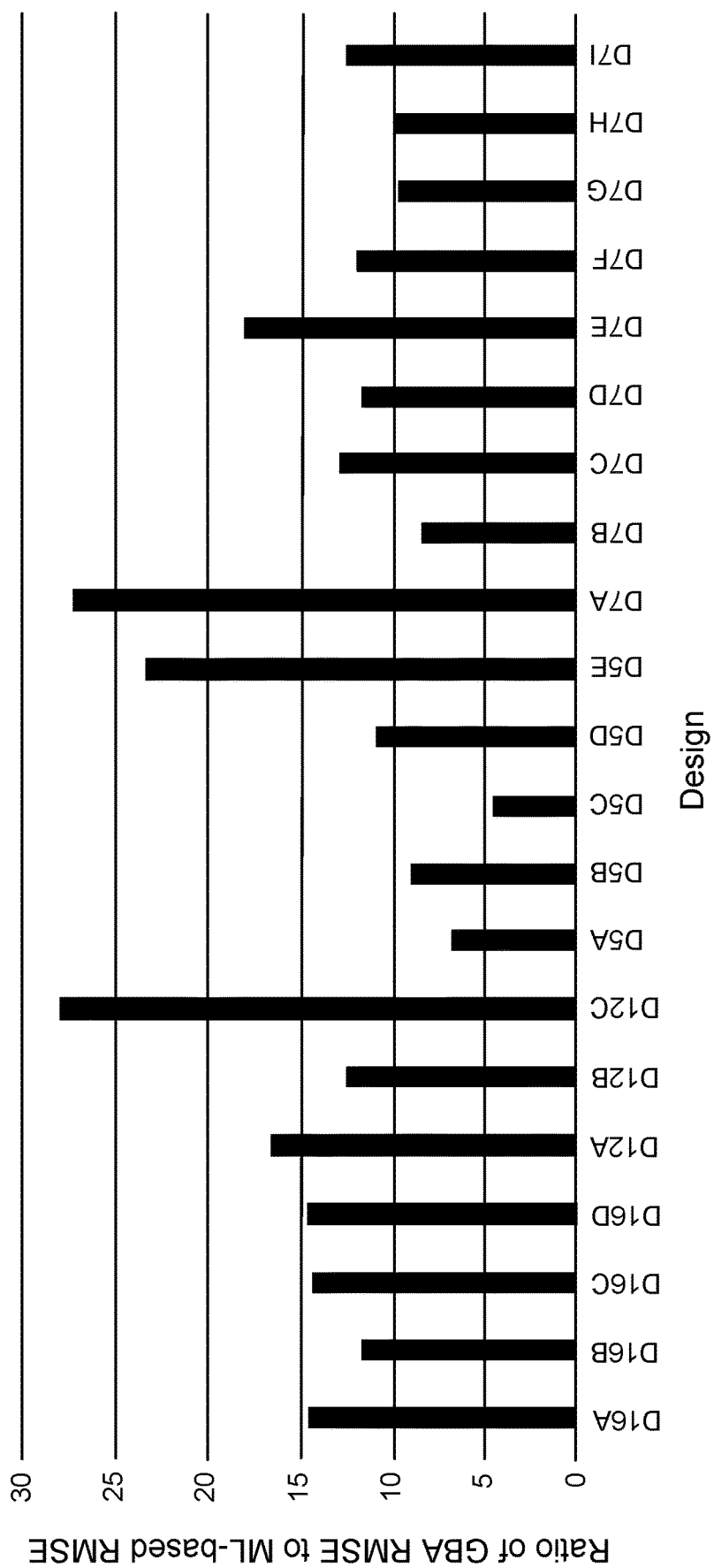
FIG. 6 plots ratio of RMSEs for the recovery model for different designs.

RMSE is used as the loss function. RMSE measures the difference from the true PBA slack values per endpoint per MCMM scenario. For the baseline GBA flow without ML models, RMSE is computed using true PBA and the GBA slack values. From the flow using ML models, RMSE is computed using true PBA and slack values predicted by the ML models. The ratio of the RMSE values without the ML model (i.e., GBA slack) to the RMSE values using the model (i.e., slack predicted by ML model) is compared in FIGS. 5 and 6 for the delay and recovery models, respectively. The ML models are more accurate in predicting PBA slack, and improve correlation with PBA slack.

The post-route optimization flow recipe is also run for each of the 21 industrial designs. This includes two or more iterations of the flow. The netlist is finally timed using PBA path mode for final PPA reporting. The same flow recipes are used to compare the baseline GBA flow with the ML-augmented GBA flow for apples-to-apples comparison. Results are shown in Table 4.

TABLE 4

Comparison of PPA metrics for selected designs from each node.

| | GBA | | | ML | | |
|---|---|---|---|---|---|---|
| Design | TNS (ns) | Area ($\mu m^2$) | Power (mW) | TNS (ns) | Area ($\mu m^2$) | Power (mW) |
| D16C | −14.3 | 813 K | 3567 | −19.6 (0.23%) | 812 K (−0.02%) | 3526 (−1.16%) |
| D16D | −2.64 | 701 K | 762 | −13.1 (0.16%) | 700 K (−0.04%) | 3626 (−0.87%) |
| D12A$^Y$ | −99.4 | 286 K | 30.4 | −81.3 (−0.41%) | 283 K (−0.92%) | 28.2 (−7.19%) |
| D7B | −4.16 | 291 K | 1145 | −6.83 (0.20%) | 291 K (−0.07%) | 1142 (−0.23%) |
| D7F$^Y$ | −0.25 | 74 K | 9.97 | −0.55 (0.13%) | 72 K (−0.86%) | 8.80 (−11.7%) |
| D5C | −1.22 | 11 K | 201 | −1.14 (−0.08%) | 10 K (−0.39%) | 202 (0.25%) |

($^Y$ signifies a leakage-centric design.)

Table 4 shows a set of representative designs to compare key PPA metrics (TNS, area and power) between the baseline GBA and the ML-augmented flows. For unbiased comparison of % TNS change, the path delay is factored in so that improvements can be measured by normalizing to path delay. For example, 1 ps improvement in slack is significant when path delay is 5 ps vs. 50 ps. The change in TNS (expressed as %) is computed by dividing the delta TNS with the path delay of ML-augmented flow for every endpoint across all scenarios, and then compute the average across all the endpoints. For area, only the area of optimizable instances is shown, i.e., the area of memory and other macros is omitted. The ML-augmented flow achieves large improvements in area (up to 0.92%), leakage power (up to 11.7%), and total power (up to 1.16%), with almost very neutral TNS. ML-augmented flow runtimes are <5% over the GBA runtimes for these designs.

Finally, PPA and TAT/runtime statistics of the ML-augmented flow GBA as a percentage change over the GBA baseline are compared across all 21 designs in Table 5. The mean % TNS change is compared for path delay-normalized TNS as explained above. Area, leakage and dynamic power improvements over all designs are significant as observed from the mean and coefficient of variation (p/v) values. Row "% Win" reports the % designs with improvements in a metric over the GBA flow. Again, area and power metrics show significant wins of >79%. Row "% Neutral" shows % designs in which the metrics are almost unchanged. There are small WNS losses on three designs, and small TNS losses on 11 out of 21 designs.

TABLE 5

Comparison of %change over the GBA baseline of PPA and runtime metrics across all designs.

| Statistics | WNS | TNS | Area | Leakage | Dynamic |
|---|---|---|---|---|---|
| Mean (μ) | +0.02% | +0.07% | −0.12% | −2.30% | −0.14% |
| Avg. μ/σ | +0.11 | +1.88 | −2.94 | −3.17 | −2.95 |
| % Win | 48% | 33% | 81% | 95% | 79% |
| % Neutral | 38% | 14% | 0% | 0% | 21% |

| Statistics | Runtime | THV | DRC | #MaxTran Violations |
|---|---|---|---|---|
| Mean (μ) | +3.37% | +6.27% | −4.76% | −3.12% |
| Avg. μ/σ | +1.78 | +0.74 | −0.37 | −0.88 |
| % Win | 43% | 43% | 10% | 76% |
| % Neutral | 19% | 10% | 80% | 10% |

Note that the runtime overhead of the ML-augmented flow is limited to around 3.4% compared to the GBA flow. This is primarily due to the "on-the-fly" training and inference flow.

EDA Processes

Figure 7:
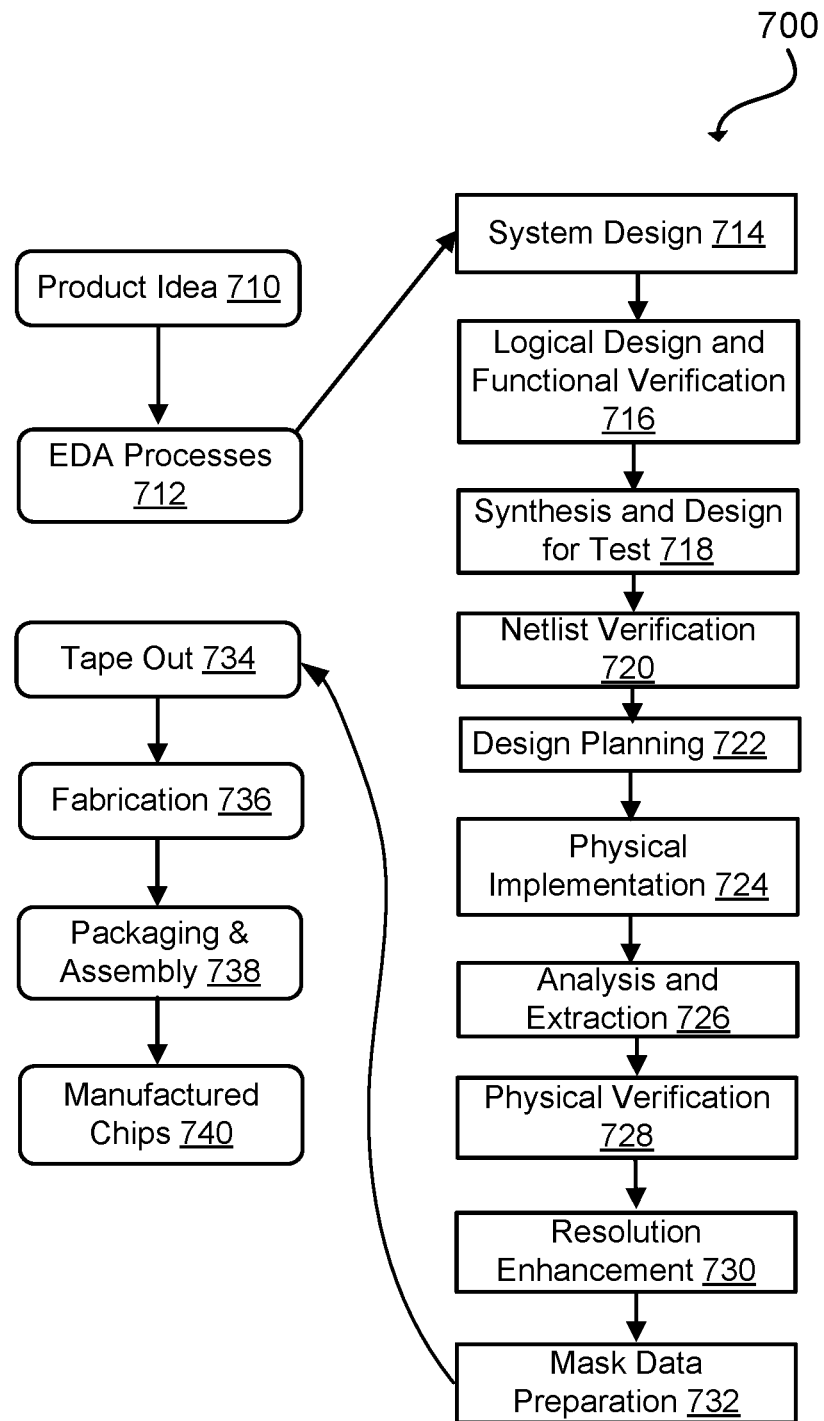
FIG. 7 depicts a flowchart of various processes used during the design and manufacture of an integrated circuit in accordance with some embodiments of the present disclosure.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 7. The processes described by be enabled by EDA products (or tools).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 800 of FIG. 8) may be used to store the programs and data structures that are used by some or all of the EDA products described herein, and products used for development of cells for the library and for physical and logical design that use the library.

Figure 8:
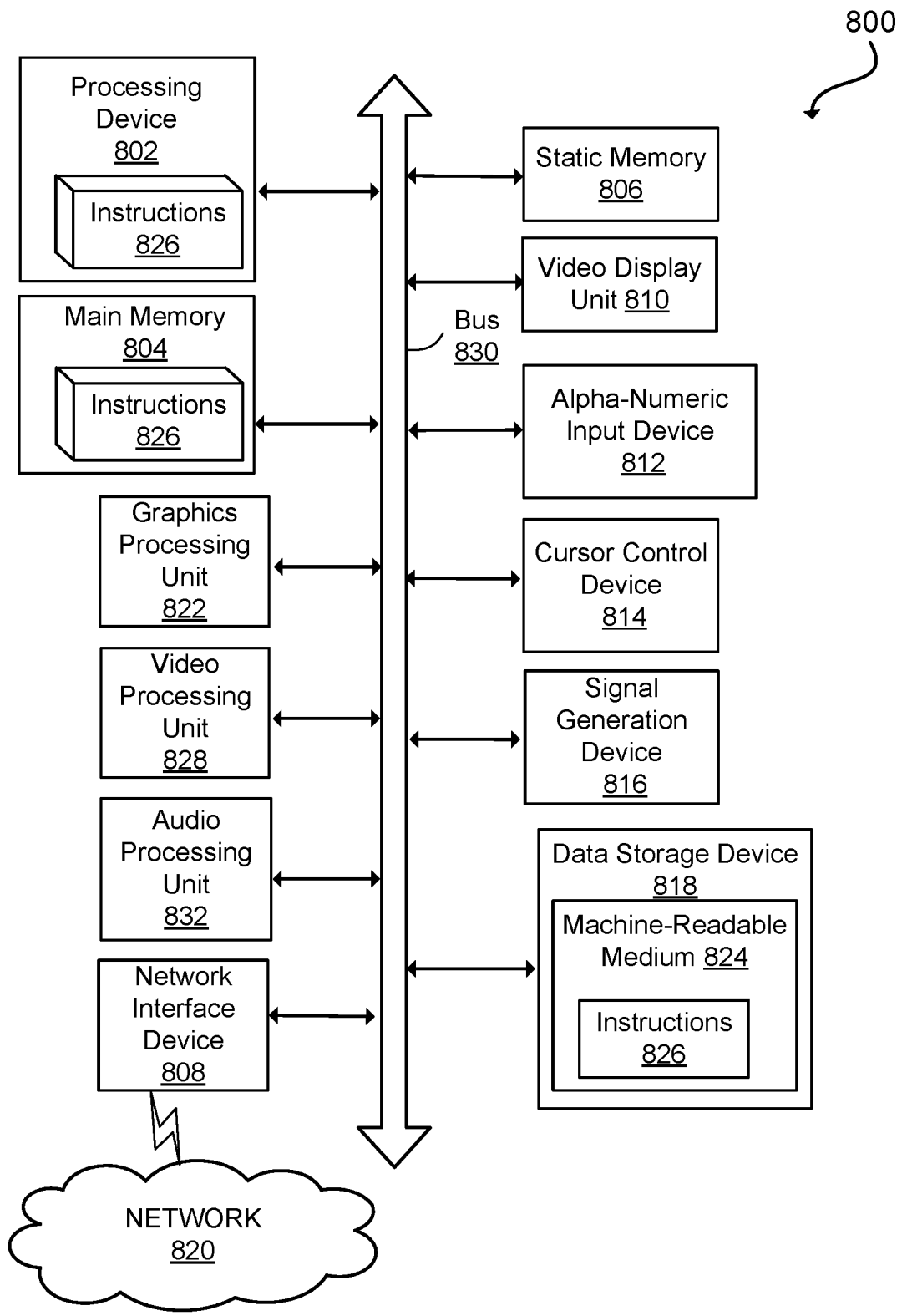
FIG. 8 depicts a diagram of an example computer system in which embodiments of the present disclosure may operate.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
    applying a graph-based timing analysis (GBA) to a circuit design to produce timing estimates of timing paths in the circuit design;
    determining features of the timing paths from the GBA; and
    applying, by a processor, a machine learning (ML) model that receives as inputs the GBA timing estimates and the features of the timing paths determined from the GBA and outputs ML-modified timing estimates of the timing paths, wherein the features used as input by the ML model comprise at least one feature from at least one of the following categories: physical context of the timing paths, physical constraints on the timing paths, timing constraints on the timing paths, logical context of the timing paths, and timing context of the timing paths.

2. The method of claim 1 wherein at least some of the features are derived from results produced by the GBA.

3. The method of claim 1 wherein the features used by the ML model comprise at least one feature from each of the following categories: physical context of the circuit design, physical constraints on the circuit design, timing constraints on the circuit design, logical context of the circuit design, and timing context of the circuit design.

4. The method of claim 1 wherein the ML model uses at least 20 different features of the circuit design.

5. The method of claim 1 wherein the timing estimates comprise timing delays for timing paths through the circuit design.

6. The method of claim 1 wherein the ML model comprises a forest of trees model.

7. The method of claim 1 wherein the ML model was trained using timing estimates produced by path-based timing analysis (PBA).

8. A system comprising:
a memory storing instructions; and
a processor, coupled with the memory and to execute the instructions, the instructions when executed cause the processor to perform a method comprising:
accessing a circuit design; and
applying, by a processor, a timing improvement flow to the circuit design by iteratively:
producing timing estimates of the circuit design, comprising applying a graph-based timing analysis (GBA) to the circuit design to produce timing estimates and applying a machine learning (ML) model that receives as inputs the GBA timing estimates and features of the timing paths determined from the GBA and outputs ML-modified timing estimates of the timing paths; and
modifying the circuit design based on the ML-modified timing estimates.

9. The system of claim 8 further comprising:
training the ML model based on timing estimates produced by previous iterations of the timing improvement flow.

10. The system of claim 9 wherein training the ML model is further based on features of the circuit design extracted during previous iterations of the GBA.

11. The system of claim 9 wherein training the ML model occurs concurrently with the timing improvement flow.

12. The system of claim 9 wherein training the ML model is further based on timing estimates produced by path-based timing analysis (PBA), the method further comprising:
tracking a distribution of the PBA timing estimates across multiple iterations; and
in response to a shift in the distribution of PBA timing estimates, training a new ML model and applying the new ML model to improve the GBA.

13. The system of claim 8 wherein the timing improvement flow comprises a timing convergence phase that includes applying the ML model.

14. The system of claim 8 wherein the timing improvement flow comprises a recovery phase that includes applying the ML model.

15. A non-transitory computer readable medium comprising stored instructions, which when executed by a processor, cause the processor to perform a method comprising:
accessing a circuit design; and
applying, by a processor, a timing improvement flow to the circuit design by iteratively:
producing timing estimates of the circuit design, comprising applying a graph-based timing analysis (GBA) to the circuit design to produce timing estimates and applying a machine learning (ML) model that receives as inputs the GBA timing estimates and features of the timing paths determined from the GBA and outputs ML-modified timing estimates of the timing paths; and
modifying the circuit design based on the ML-modified timing estimates;
wherein the timing improvement flow comprises a timing convergence phase and a recovery phase, the timing convergence phase comprises modifying the circuit design to meet timing constraints on the ML-modified timing estimates, the recovery phase comprises modifying the circuit design to improve power and/or area subject to meeting timing constraints on the ML-modified timing estimates, and the timing convergence phase and the recovery phase use different ML models.

16. The non-transitory computer readable medium of claim 15 wherein the timing improvement flow is further based on the ML-modified timing estimates plus a guard band.

17. The non-transitory computer readable medium of claim 15 wherein the timing convergence phase uses two different ML models for different iterations, and the recovery phase uses a third different ML model.

18. The non-transitory computer readable medium of claim 15 wherein the circuit design is at a technology node of 16 nm or smaller.

19. The non-transitory computer readable medium of claim 15 wherein the features used by the ML models are produced by the GBA.

20. The non-transitory computer readable medium of claim 15 wherein the features used by the ML models comprise at least one feature from each of the following categories: physical context of the circuit design, physical constraints on the circuit design, timing constraints on the circuit design, logical context of the circuit design, and timing context of the circuit design.

* * * * *